US012631344B2

(12) United States Patent
Shin

(10) Patent No.: US 12,631,344 B2
(45) Date of Patent: May 19, 2026

(54) RANGE HOOD THAT IDENTIFIES AN INGREDIENT FOR COOKING AND A CONTROL METHOD THEREOF

(71) Applicant: SAMSUNG ELECTRONICS CO., LTD., Suwon-si (KR)

(72) Inventor: Kyungeun Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 418 days.

(21) Appl. No.: 18/377,164

(22) Filed: Oct. 5, 2023

(65) Prior Publication Data

US 2024/0102666 A1 Mar. 28, 2024

Related U.S. Application Data

(63) Continuation of application No. PCT/KR2023/011687, filed on Aug. 8, 2023.

(30) Foreign Application Priority Data

Sep. 27, 2022 (KR) ........................ 10-2022-0122809

(51) Int. Cl.
*F24C 15/20* (2006.01)
*G06V 10/82* (2022.01)
*G06V 20/70* (2022.01)

(52) U.S. Cl.
CPC .......... *F24C 15/2021* (2013.01); *G06V 10/82* (2022.01); *G06V 20/70* (2022.01)

(58) Field of Classification Search
CPC ........ G06V 20/70; G06V 10/82; G06V 20/52; F24C 15/2021
See application file for complete search history.

(56) References Cited

U.S. PATENT DOCUMENTS

| | | | |
|---|---|---|---|
| 8,734,210 B2 | 5/2014 | Burdett et al. | |
| 9,587,839 B2 | 3/2017 | Burdett et al. | |
| 10,907,839 B2 | 2/2021 | Wu | |
| 11,353,218 B2 | 6/2022 | Yoon | |
| 2018/0372332 A1 | 12/2018 | Cha et al. | |

(Continued)

FOREIGN PATENT DOCUMENTS

| | | |
|---|---|---|
| CN | 109506262 B | 6/2020 |
| JP | 2012-32102 A | 2/2012 |

(Continued)

OTHER PUBLICATIONS

International Search Report issued on Dec. 1, 2023 by International Searching Authority in International Application No. PCT/KR2023/011687.

(Continued)

*Primary Examiner* — Alfred Basichas

(74) *Attorney, Agent, or Firm* — Sughrue Mion, PLLC

(57) ABSTRACT

A range hood is disclosed. The range hood includes a driving part that suctions the ambient air and discharges the air to the outside, and at least one processor configured to acquire first identification information for a subject for cooking and second identification information for a cooking container, acquire operation information of the driving part based on the first identification information and the second identification information, and control the driving part based on the operation information.

20 Claims, 11 Drawing Sheets

(56)            References Cited

U.S. PATENT DOCUMENTS

| | | | |
|---|---|---|---|
| 2023/0068718 | A1 | 3/2023 | Kim |
| 2023/0129115 | A1 | 4/2023 | Sinur et al. |
| 2023/0314002 | A1* | 10/2023 | Heckmann .......... F24C 15/2021 |
| | | | 219/446.1 |

FOREIGN PATENT DOCUMENTS

| | | | |
|---|---|---|---|
| KR | 2001-0037176 | A | 5/2001 |
| KR | 10-0529243 | B1 | 11/2005 |
| KR | 10-2021-0090914 | A | 7/2021 |
| KR | 10-2021-0092023 | A | 7/2021 |
| KR | 10-2372170 | B1 | 3/2022 |
| KR | 10-2022-0085509 | A | 6/2022 |
| KR | 10-2022-0151909 | A | 11/2022 |
| KR | 10-2023-0046036 | A | 4/2023 |

OTHER PUBLICATIONS

Written Opinion issued on Dec. 1, 2023 by International Searching
Authority in International Application No. PCT/KR2023/011687.

* cited by examiner

FIG. 6

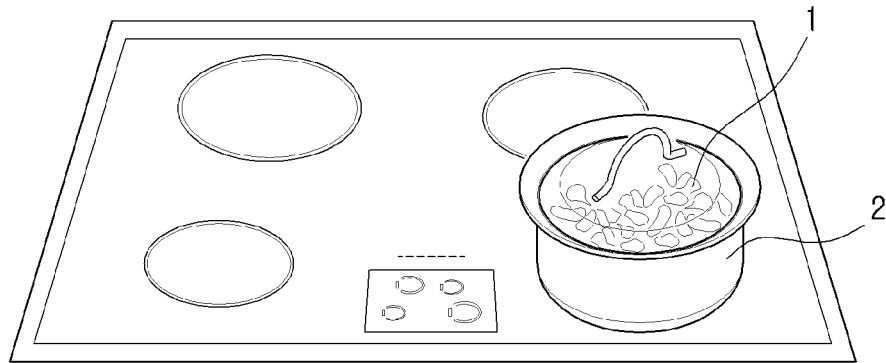

| | | FRYING PAN (GRILLING) | POT(SIMMERING ,BOILING,ETC.) | FRYER (FRYING) | STEAMER (STEAMING) |
|---|---|---|---|---|---|
| RAW MEAT | EXPECTED COOKING TIME | 15 MINUTES | 100 MINUTES | 20 MINUTES | 40 MINUTES |
| | EXHAUST STRENGTH | MAX | MEDIUM DURING THE INITIAL 50 MINUTES + MINIMUM DURING THE NEXT 50 MINUTES | MAX | MEDIUM |
| | ADDITIONAL OPERATION TIME | +10 MINUTES | +10 MINUTES | +10 MINUTES | +5 MINUTES |
| | STRENGTH AFTER COMPLETION | MAX | MINIMUM | MAX | MINIMUM |
| CLAMS | EXPECTED COOKING TIME | 30 MINUTES | 10 MINUTES | | 30 MINUTES |
| | EXHAUST STRENGTH | MEDIUM | MEDIUM | | MEDIUM |
| | ADDITIONAL OPERATION TIME | +5 MINUTES | +5 MINUTES | | +10 MINUTES |
| | STRENGTH AFTER COMPLETION | MAX | MEDIUM | | MINIMUM |
| EGGS | EXPECTED COOKING TIME | 5 MINUTES | 15 MINUTES | | 15 MINUTES |
| | EXHAUST STRENGTH | MEDIUM | MINIMUM | | MINIMUM |
| | ADDITIONAL OPERATION TIME | +2 MINUTES | +0 MINUTE | | +5 MINUTES |
| | STRENGTH AFTER COMPLETION | MINIMUM | | | MINIMUM |
| WATER | EXPECTED COOKING TIME | | 5 MINUTES | | |
| | EXHAUST STRENGTH | | MINIMUM | | |
| | ADDITIONAL OPERATION TIME | | +0 MINUTE | | |
| | STRENGTH AFTER COMPLETION | | | | |

Hood with Camera

RANGE HOOD THAT IDENTIFIES AN INGREDIENT FOR COOKING AND A CONTROL METHOD THEREOF

CROSS-REFERENCE TO RELATED APPLICATIONS

This application is a by-pass continuation of International Application No. PCT/KR2023/011687, filed on Aug. 8, 2023, which is based on and claims priority to Korean Patent Application No. 10-2022-0122809, filed on Sep. 27, 2022, in the Korean Intellectual Property Office, the disclosures of which are incorporated by reference herein in their entireties.

BACKGROUND

1. Field

The disclosure relates to a range hood and a control method thereof, and more particularly, to a range hood that identifies a subject for cooking and controls an operation, and a control method thereof.

2. Description of Related Art

Homes wherein cooking devices and range hoods are installed in kitchens are increasing.

A cooking device may mean an electric range and/or a gas range heating a cooking container through at least one burner.

A range hood located over a cooking device (e.g., an opposite direction to gravity) may discharge smoke, vapor, odor, etc. generated from a cooking container to the outside through a fan. A range hood is a ventilation device that can be installed in a kitchen, and it may be installed together with a cooking device.

Until cooking using a cooking container is completed, the user discharges smoke, vapor, odor, etc. generated from the cooking process to the outside by manually operating a range hood. As a manual control by the user is necessary for operating the range hood, there is a problem that the user inhales the smoke, vapor, odor, etc. generated from the cooking process.

Accordingly, there has been a demand for a method of discharging smoke, vapor, odor, etc. generated from a cooking process to the outside by appropriately operating a range hood without a user's manual control.

SUMMARY

According to an aspect of the disclosure, a range hood includes: a driving part configured to suction air from a first location and discharge the suctioned air to a second location; at least one memory storing at least one instruction; and at least one processor configured to execute the at least one instruction to: acquire first identification information related to a subject for cooking and second identification information related to a cooking container, acquire operation information of the driving part based on the first identification information and the second identification information, and control the driving part based on the operation information, wherein the operation information includes: at least one of a first operation strength of the driving part corresponding to a cooking time of the subject for cooking, an additional operation time of the driving part corresponding to a period following the cooking time, or a second operation strength of the driving part corresponding to the additional operation time.

The at least one processor of the range hood may be further configured to execute the at least one instruction to: input the first identification information and the second identification information into a trained neural network model and acquire the operation information including an expected cooking time corresponding to the subject for cooking and the cooking container, control the driving part to operate at the first operation strength during the expected cooking time, and control the driving part to operate at the second operation strength during the additional operation time.

The range hood may further include: a camera configured to capture an image of an upper plate of a cooking device located below the driving part, wherein the at least one processor may be further configured to execute the at least one instruction to: based on acquiring an image through the camera including the subject for cooking located on the upper plate and the cooking container located on the upper plate, acquire each of the first identification information and the second identification information based on the acquired image.

The range hood may further include: a communication interface, wherein the at least one processor may be further configured to execute the at least one instruction to: based on receiving state information of the cooking device from the cooking device through the communication interface, input the state information, the first identification information, and the second identification information into a trained neural network model and acquire the operation information, and wherein the state information may include: at least one of burner activation information including an activation state of a burner area corresponding to a location of the cooking container on the upper plate or heating power strength information corresponding to the burner area corresponding to the location of the cooking container on the upper plate.

The at least one processor of the range hood may be further configured to execute the at least one instruction to: identify a starting point of cooking for the subject for cooking based on the burner activation information, and control the driving part to operate at the first operation strength based on the identified starting point of cooking.

The at least one processor of the range hood may be further configured to execute the at least one instruction to: identify an ending point of cooking for the subject for cooking based on the burner activation information, and control the driving part to operate at the second operation strength based on the identified ending point of cooking.

The at least one processor of the range hood may be further configured to execute the at least one instruction to: input the first identification information and the second identification information into a trained neural network model and acquire the operation information including predicted concentration information corresponding to a time when the subject for cooking is being cooked, wherein the predicted concentration information includes a predicted concentration of at least one of smoke, dust, cooking odor, or cooking vapor generated while the subject for cooking is being cooked.

The trained neural network model may be configured to output the first operation time, the additional operation time and the second operation strength based on the predicted concentration information.

The range hood may further include: a communication interface, and the at least one processor may be further configured to execute the at least one instruction to: acquire, through the communication interface, at least one of the first identification information, the second identification information, or information on a state of the cooking device wherein the cooking container is located, and input the first identification information, the second identification information, or the state information into a trained neural network model and acquire the operation information.

The range hood may further include: an air quality sensor, and the at least one processor may be further configured to execute the at least one instruction to: based on receiving sensing data through the air quality sensor, update the operation information of the driving part based on the received sensing data.

According to an aspect of the disclosure, a method of controlling a range hood including a driving part configured to suction air from a first location and discharge the suctioned air to a second location includes: acquiring first identification information related to a subject for cooking and second identification information related to a cooking container; acquiring operation information of the driving part based on the first identification information and the second identification information; and controlling the driving part based on the operation information, wherein the operation information includes: at least one of a first operation strength of the driving part corresponding to a cooking time of the subject for cooking, an additional operation time of the driving part corresponding to a period following the cooking time, or a second operation strength of the driving part corresponding to the additional operation time.

The acquiring the operation information may include: inputting the first identification information and the second identification information into a trained neural network model and acquiring the operation information including an expected cooking time corresponding to the subject for cooking and the cooking container, and the controlling the driving part may further include: controlling the driving part to operate at the first operation strength during the expected cooking time, and controlling the driving part to operate at the second operation strength during the additional operation time.

The range hood may further include a camera configured to capture an image of an upper plate of a cooking device located below the driving part, and the acquiring the first identification information and the second identification information may include: acquiring an image through the camera of the upper plate of the cooking device, wherein the acquired image includes images of the subject for cooking located on the upper plate and the cooking container located on the upper plate; and acquiring each of the first identification information and the second identification information based on the acquired image.

The acquiring the operation information may further include: based on receiving state information of the cooking device from the cooking device, inputting the state information, the first identification information, and the second identification information into a trained neural network model and acquiring the operation information, and the state information may include: at least one of burner activation information including an activation state of a burner area corresponding to a location of the cooking container on the upper plate or heating power strength information corresponding to the burner area corresponding to the location of the cooking container on the upper plate.

The controlling the driving part may further include: identifying a starting point of cooking for the subject for cooking based on the burner activation information; and controlling the driving part to operate at the first operation strength based on the identified starting point of cooking.

controlling the driving part to operate at the first operation strength based on the identified starting point of cooking.

According to an aspect of the disclosure, a non-transitory computer readable medium having instructions stored therein, which when executed by a processor cause the processor to execute a method of controlling a range hood including a driving part configured to suction air from a first location and discharge the suctioned air to a second location, the method including: acquiring first identification information related to a subject for cooking and second identification information related to a cooking container; acquiring operation information of the driving part based on the first identification information and the second identification information; and controlling the driving part based on the operation information, wherein the operation information includes: at least one of a first operation strength of the driving part corresponding to a cooking time of the subject for cooking, an additional operation time of the driving part corresponding to a period following the cooking time, or a second operation strength of the driving part corresponding to the additional operation time.

The acquiring the operation information may include: inputting the first identification information and the second identification information into a trained neural network model and acquiring the operation information including an expected cooking time corresponding to the subject for cooking and the cooking container, and the controlling the driving part may further include: controlling the driving part to operate at the first operation strength during the expected cooking time, and controlling the driving part to operate at the second operation strength during the additional operation time.

The range hood may further include a camera configured to capture an image of an upper plate of a cooking device located below the driving part, and the acquiring the first identification information and the second identification information may include: acquiring an image through the camera of the upper plate of the cooking device, wherein the acquired image includes images of the subject for cooking located on the upper plate and the cooking container located on the upper plate; and acquiring each of the first identification information and the second identification information based on the acquired image.

The acquiring the operation information may further include: based on receiving state information of the cooking device from the cooking device, inputting the state information, the first identification information, and the second identification information into a trained neural network model and acquiring the operation information, and the state information may include: at least one of burner activation information including an activation state of a burner area corresponding to a location of the cooking container on the upper plate or heating power strength information corresponding to the burner area corresponding to the location of the cooking container on the upper plate.

The controlling the driving part may further include: identifying a starting point of cooking for the subject for cooking based on the burner activation information; and controlling the driving part to operate at the first operation strength based on the identified starting point of cooking.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a diagram for illustrating operation information according to one or more embodiments of the disclosure;

DETAILED DESCRIPTION

Figure 1:
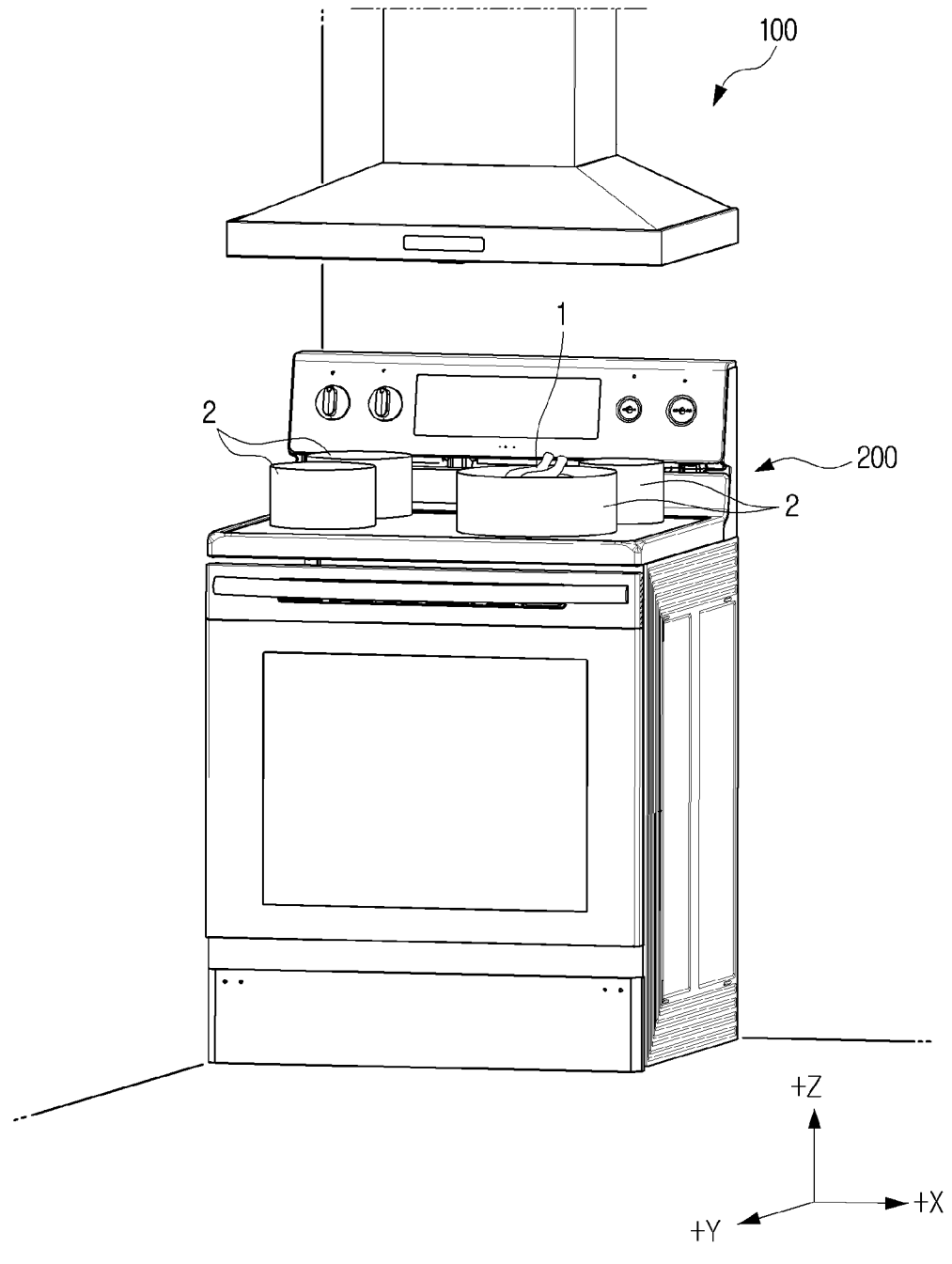
FIG. 1 is a perspective view for illustrating a detailed configuration of a range hood according to an embodiment.

Hereinafter, the disclosure will be described in detail with reference to the accompanying drawings.

As terms used in the embodiments of the disclosure, general terms that are currently used widely were selected where possible, in consideration of the functions described in the disclosure. However, the terms may vary depending on the intention of those skilled in the art, previous court decisions, or emergence of new technologies, etc. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g.: elements such as numbers, functions, operations, and components), and do not exclude the existence of additional characteristics.

In addition, the expression "at least one of A and/or B" should be interpreted to mean any one of "A" or "B" or "A and B."

Further, the expressions "first," "second," and the like used in this specification may describe various elements regardless of any order and/or degree of importance. Also, such expressions are used only to distinguish one element from another element, and are not intended to limit the elements.

Also, the description in the disclosure that one element (e.g., a first element) is "(operatively or communicatively)

coupled with/to" or "connected to" another element (e.g., a second element) should be interpreted to include both the case where the one element is directly coupled to the another element, and the case where the one element is coupled to the another element through still another element (e.g., a third element).

In addition, singular expressions include plural expressions, unless defined obviously differently in the context. Also, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Further, in the disclosure, "a module" or "a part" performs at least one function or operation, and may be implemented as hardware or software, or as a combination of hardware and software. Also, a plurality of "modules" or a plurality of "parts" may be integrated into at least one module and implemented as at least one processor, except "a module" or "a part" that needs to be implemented as specific hardware.

Also, in this specification, the term "user" may refer to a person who uses an electronic device or a device using an electronic device (e.g., an artificial intelligence electronic device).

Hereinafter, embodiments of the disclosure will be described in more detail with reference to the accompanying drawings.

FIG. 1 is a perspective view for illustrating a detailed configuration of a range hood.

FIG. 1 is a schematic perspective view illustrating a range hood 100 and a cooking device 200.

Referring to FIG. 1, the range hood 100 located on the upper plate (e.g., the +z axis direction) of the cooking device 200 may include a driving part 110.

Here, the driving part 110 may suction the ambient air and discharge the air to the outside for removing smoke, dust, cooking vapor, cooking odor, etc. generated during a cooking process through a cooking container 2 for a subject for cooking 1 (or, a subject to be cooked, food, etc.) placed on the upper plate of the cooking device 200.

As an example, the cooking device 200 located below the range hood 100 (e.g., the −z axis direction) may include at least one of an electric range, a gas range, or an induction range. However, the disclosure is not limited thereto, and the cooking device 200 can include a combination of an electric range, a gas range, and an induction range (e.g., a hybrid range). Also, the cooking device 200 can include an oven, an air fryer, etc. that cook the subject for cooking 1 by generating heat of a high temperature by using gas or electricity.

As an example, the range hood 100 may identify the subject for cooking 1 that is being cooked (or, is expected to be cooked) in the cooking device 200, and operate the driving part 110 automatically without the user's manipulation (or, setting) by predicting smoke, dust, cooking vapor, or cooking odor, etc. generated in the cooking process through the cooking container 2 for the subject for cooking 1.

As an example, the range hood 100 may acquire predicted concentration information for the smoke, dust, cooking vapor, cooking odor, etc. that are expected to be generated during the cooking process, and operate the driving part 110 during the cooking time for the subject for cooking 1 based on the predicted concentration information.

Here, the cooking time may include the user's cooking time for the subject for cooking 1 (e.g., the time of heating the subject for cooking 1 by using the cooking device 200), or the expected cooking time for the subject for cooking 1.

For example, the range hood 100 may acquire the predicted concentration information for the smoke, dust, cooking vapor, or cooking odor, etc. that are expected to be generated during the cooking process, and the expected cooking time required for cooking the subject for cooking 1, and operate the driving part 110 based on the predicted concentration information during the expected cooking time.

Also, the range hood 100 may acquire an additional operation time for operating the driving part 110 after the cooking time passed. For example, even if the range hood 100 operates the driving part 110 during the cooking time for the subject for cooking 1, the smoke, dust, cooking vapor, cooking odor, etc. generated in the cooking process may remain in the ambient air after the cooking process is completed.

The range hood 100 according to one or more embodiments may operate the driving part 110 during the additional operation time after the cooking time passed.

Also, the range hood 100 according to one or more embodiments may operate the driving part 110 during the additional operation time after the expected cooking time passed.

Accordingly, the range hood 100 may acquire an additional operation time of the driving part 110 for suctioning the ambient air and discharging the air to the outside after the cooking time passed, and operate the driving part 110 automatically during the additional operation time without the user's manipulation (or, setting) after the cooking time passed.

Figure 2:
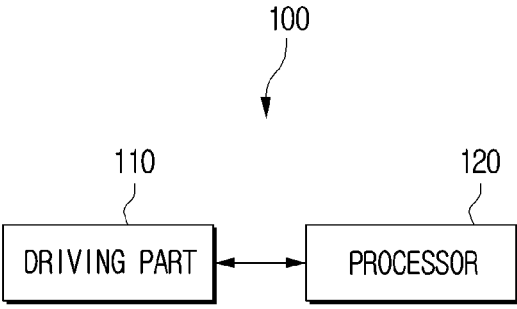
FIG. 2 is a block diagram illustrating a configuration of a range hood according to one or more embodiments of the disclosure.

FIG. 2 is a block diagram illustrating a configuration of a range hood according to one or more embodiments of the disclosure.

The range hood 100 includes the driving part 110. As an example, the range hood 100 includes the driving part 110 that suctions the ambient air and discharges the air to the outside through a duct, and as the driving part 110 suctions the ambient air and discharges the air to the outside, the smoke, dust, cooking vapor, or cooking odor, etc. generated in the cooking process (or, that were generated in the cooking process) may be removed, or the concentration may be reduced.

As an example, the driving part 110 may include a motor and a fan, and the rotation speed of the motor may be changed according to control by at least one processor 120, and the rotation speed of the fan may be changed according to the rotation speed of the motor.

The at least one processor 120 according to one or more embodiments of the disclosure performs overall control operations of the range hood 100.

The at least one processor 120 may include one or more of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The at least one processor 120 may control one or a random combination of other components of the electronic device, and perform operations regarding communication or data processing. The at least one processor 120 may execute one or more programs or instructions stored in a memory. For example, the at least one processor 120 may perform the method according to one or more embodiments of the disclosure by executing the one or more instructions stored in the memory.

In a case where the method according to one or more embodiments of the disclosure includes a plurality of operations, the plurality of operations may be performed by one processor, or may be performed by a plurality of processors. For example, when a first operation, a second operation, and a third operation are performed by the method according to one or more embodiments, all of the first operation, the second operation, and the third operation may be performed by a first processor, or the first operation and the second operation may be performed by the first processor (e.g., a generic-purpose processor), and the third operation may be performed by a second processor (e.g., an artificial intelligence-dedicated processor).

The at least one processor 120 may be implemented as a single core processor including one core, or it may be implemented as one or more multicore processors including a plurality of cores (e.g., multicores of the same kind or multicores of different kinds). In case the at least one processor 120 is implemented as a multicore processor, each of the plurality of cores included in the multicore processor may include an internal memory of the processor such as a cache memory, an on-chip memory, etc., and a common cache shared by the plurality of cores may be included in the multicore processor. Also, each of the plurality of cores (or some of the plurality of cores) included in the multicore processor may independently read a program instruction for implementing the method according to one or more embodiments of the disclosure and perform the instruction, or the plurality of entire cores (or some of the cores) may be linked with one another, and read a program instruction for implementing the method according to one or more embodiments of the disclosure and perform the instruction.

In a case where the method according to one or more embodiments of the disclosure includes a plurality of operations, the plurality of operations may be performed by one core among the plurality of cores included in the multicore processor, or performed by the plurality of cores. For example, when the first operation, the second operation, and the third operation are performed by the method according to one or more embodiments, all of the first operation, the second operation, and the third operation may be performed by a first core included in the multicore processor, or the first operation and the second operation may be performed by the first core included in the multicore processor, and the third operation may be performed by a second core included in the multicore processor.

In the embodiments of the disclosure, the processor may mean a system on chip (SoC) wherein at least one processor and other electronic components are integrated, a single core processor, a multicore processor, or cores included in a single core processor or a multicore processor. Here, the cores may be implemented as a CPU, a GPU, an APU, a MIC, a DSP, an NPU, a hardware accelerator, or a machine learning accelerator, etc., but the embodiments of the disclosure are not limited thereto.

In particular, the at least one processor 120 may identify first identification information for the subject for cooking 1 and second identification information for the cooking container 2.

As an example, the subject for cooking 1 includes various types of ingredients placed inside the cooking container 2, and the cooking container 2 may include various types of containers (e.g., a frying pan, a wok, a pot) placed on the upper plate of the cooking device 200.

As an example, the at least one processor 120 may identify the subject for cooking 1 based on the first identification information for the subject for cooking 1, and identify the cooking container 2 based on the second identification information for the cooking container 2.

As an example, the at least one processor 120 may acquire an image that photographed the cooking container 2 placed on the cooking device 200 and the subject for cooking 1 inside the cooking container 2 by controlling the camera provided on the range hood 100, and acquire the first identification information for the subject for cooking 1 and the second identification information for the cooking container 2 from the image. However, this is merely an example, and the disclosure is not limited thereto.

For example, the at least one processor 120 may receive and acquire the first identification information for the subject for cooking 1 and the second identification information for the cooking container 2 from a user terminal device, and the at least one processor 120 may also acquire the first identification information for the subject for cooking 1 and the second identification information for the cooking container 2 selected according to a user instruction through a panel (e.g., a control panel, etc.) provided on the range hood 100.

The at least one processor 120 may acquire operation information of the driving part 110 based on the first identification information and the second identification information. Here, the operation information may include at least one of the first operation strength of the driving part 110 during the cooking time of the subject for cooking 1, the additional operation time of the driving part 110 after the cooking time passed, or the second operation strength of the driving part 110 during the additional operation time.

The at least one processor 120 may control the driving part 110 based on the operation information.

For example, the at least one processor 120 may operate the driving part 110 according to the first operation strength during the cooking time, and operate the driving part 110 by the second operation strength during the additional operation time after the cooking time passed.

For example, when start of cooking for a subject for cooking 1 is identified (e.g., heating for the subject for cooking 1 is detected, or a movement of the user is detected around the subject for cooking 1) through the camera provided on the range hood 100, etc., the at least one processor 120 may operate the driving part 110 according to the first operation strength, and when completion of the cooking for the subject for cooking 1 is identified (i.e., after the cooking time for the subject for cooking 1 passed), the at least one processor 120 may operate the driving part 110 by the second operation strength during the additional operation time.

The at least one processor 120 according to one or more embodiments of the disclosure may identify the expected cooking time when cooking the subject for cooking 1 with the cooking container 2 as the cooking time based on the first identification information and the second identification information.

According to one or more embodiments of the disclosure, the operation information may include at least one of the first operation strength of the driving part 110 during the expected cooking time of the subject for cooking 1, the additional operation time of the driving part 110 after the expected cooking time passed, or the second operation strength of the driving part 110 during the additional operation time.

For example, the at least one processor 120 may operate the driving part 110 by the first operation strength during the expected cooking time of the subject for cooking 1, and operate the driving part 110 by the second operation strength during the additional operation time of the driving part 110 after the expected cooking time passed based on the operation information.

Figure 3:
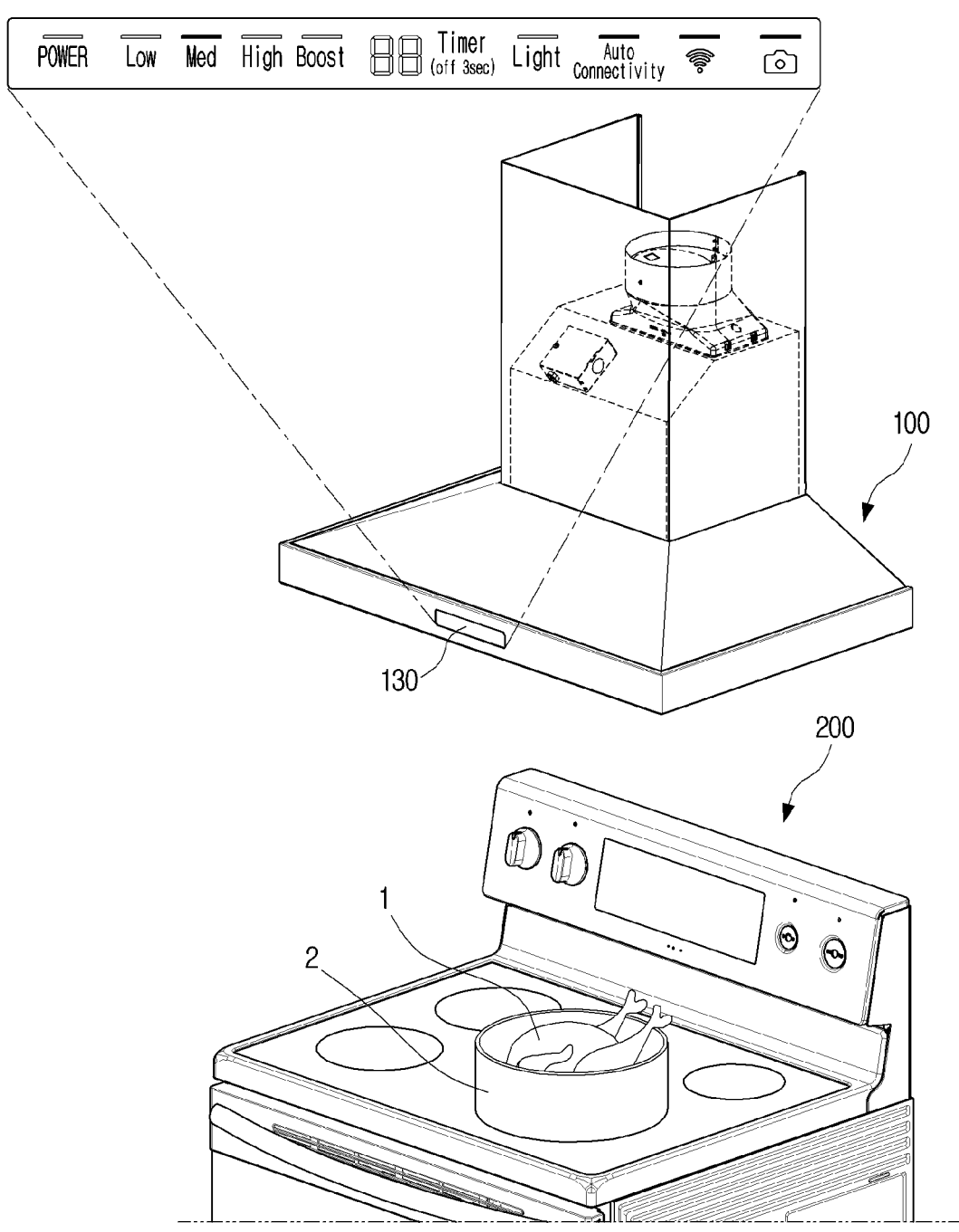
FIG. 3 is a perspective view for illustrating operations of each of a range hood and a cooking device according to one or more embodiments of the disclosure.

FIG. 3 is a perspective view for illustrating operations of each of a range hood and a cooking device according to one or more embodiments of the disclosure.

Referring to FIG. 3, the range hood 100 located over the upper plate of the cooking device 200 may include a main body, a duct cover, a driving part 110, a control circuit including the at least one processor 120, and a control panel 130 including at least one button. The number and the functions of the at least one button provided on the control panel 130 can be added, changed, or deleted according to the structure (or, the performance) of the range hood 100.

Referring to FIG. 3, the cooking device 200 located below the range hood 100 may include one of an electric range, a gas range, an induction range, or a hybrid range.

As an example, the upper plate of the cooking device 200 may include a plurality of burner areas. For example, if the cooking device 200 is a gas range, each of the plurality of burner areas may include a burner heating the cooking container 2 (e.g., a gas burner). Also, if the cooking device 200 is an electric range, each of the plurality of burner areas may include an electric burner heating the cooking container 2. In addition, if the cooking device 200 is an induction range, each of the plurality of burner areas may include an induction coil heating the cooking container 2.

The range hood 100 according to one or more embodiments of the disclosure includes a camera, and the at least one processor 120 may control the camera and acquire a photographed image for the upper plate of the cooking device 200.

For example, the at least one processor 120 may control the camera, and acquire a photographed image by a periodic interval (e.g., 100 ms, 1 sec, 3 sec).

For example, the at least one processor 120 may photograph a moving image for the upper plate of the cooking device 200, and if a change is detected in the upper plate of the cooking device 200 (e.g., if the subject for cooking 1 and the cooking container 2 are detected), the at least one processor 120 may acquire a photographed image for the upper plate of the cooking device 200.

For example, the control panel 130 provided on the range hood 100 includes a camera operation button 10, and if the camera operation button 10 is selected, the at least one processor 120 may control the camera and acquire a photographed image.

Figure 4:
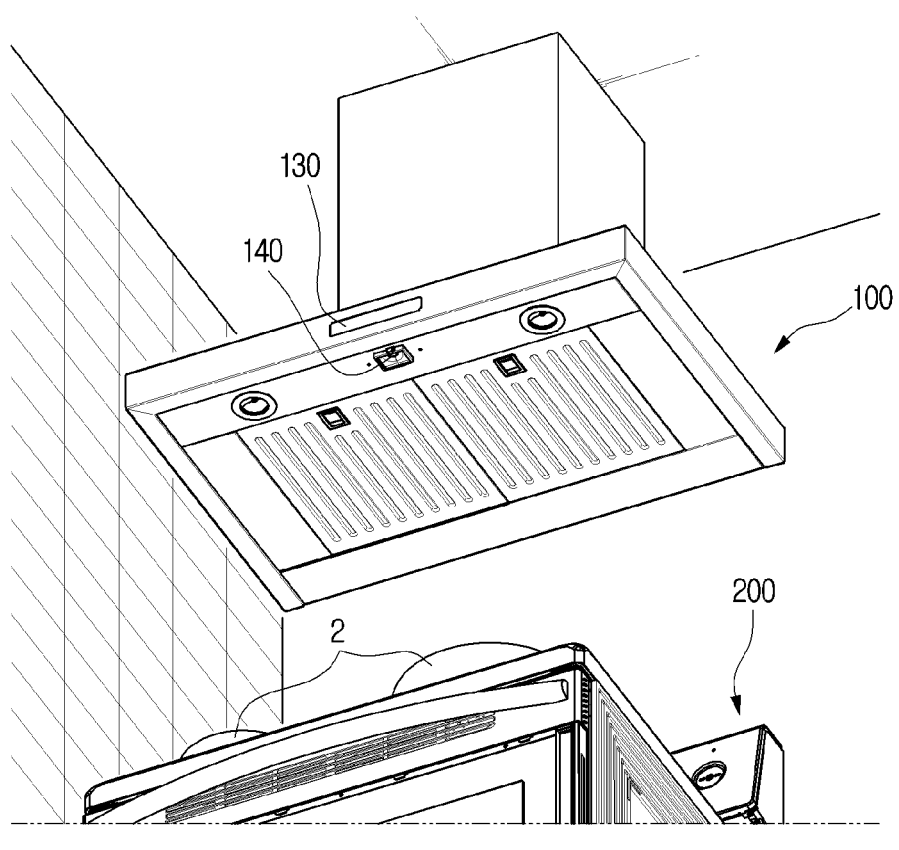
FIG. 4 is a diagram for illustrating a camera provided on a range hood according to one or more embodiments of the disclosure.

FIG. 4 is a diagram for illustrating a camera provided on a range hood according to one or more embodiments of the disclosure.

Referring to FIG. 4, a camera 140 located on the bottom surface (e.g., the −z axis direction) of the main body of the range hood 100 may be included. For example, the camera 140 may be located in the center of the bottom surface of the main body.

The camera 140 according to one or more embodiments may acquire a photographed image from the bottom surface of the main body of the range hood 100 to the direction of the upper plate of the cooking device 200 according to control by the at least one processor 120.

Figure 5:
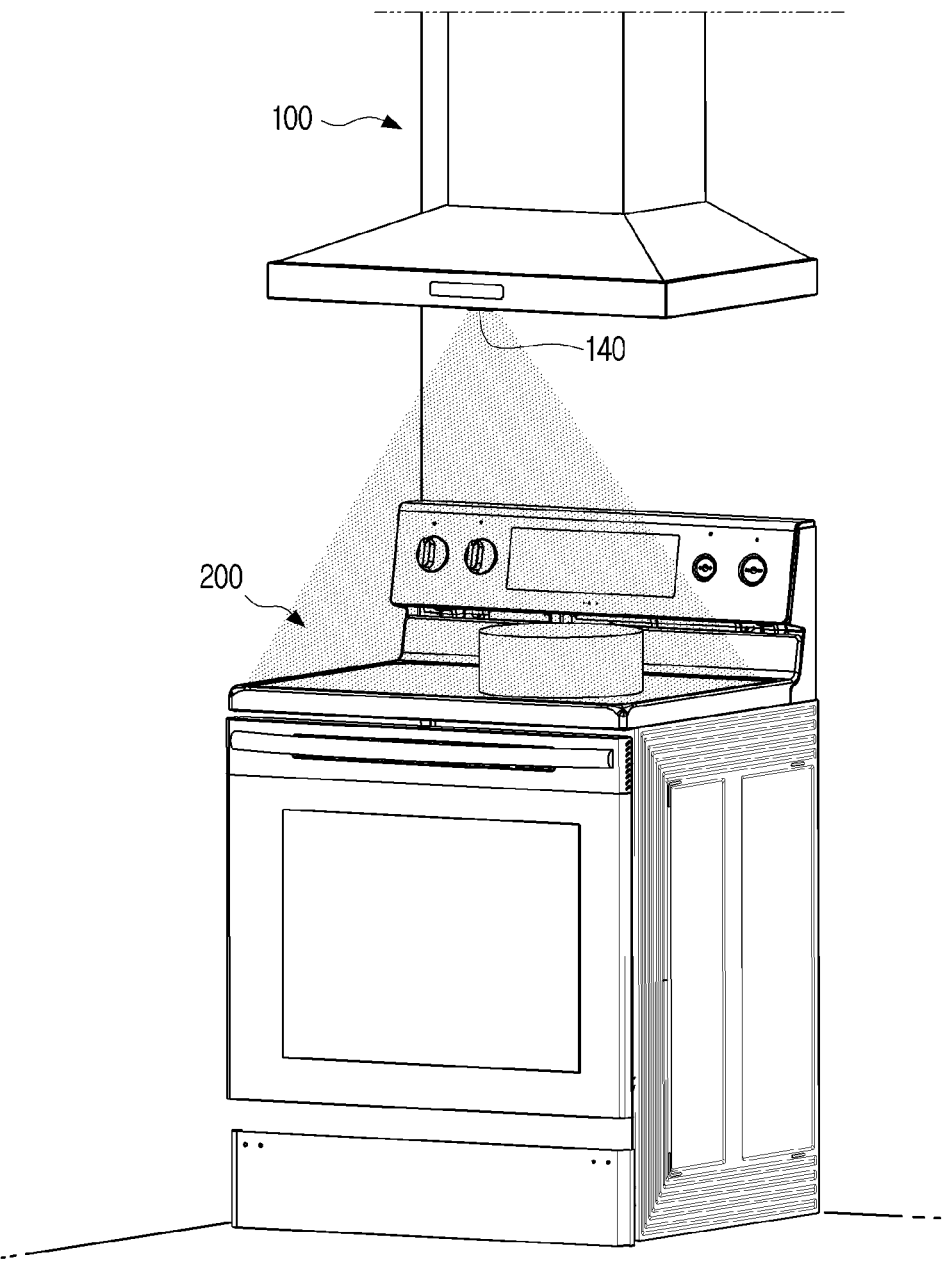
FIG. 5 is a diagram for illustrating a range hood acquiring identification information for each of a subject for cooking and a cooking container according to one or more embodiments of the disclosure.

FIG. 5 is a diagram for illustrating a range hood acquiring identification information for each of a subject for cooking and a cooking container according to one or more embodiments of the disclosure.

As illustrated in FIG. 5, the camera 140 may photograph the cooking process and the cooking situation as at least one of a still image or a moving image, and acquire a photographed image.

Meanwhile, a sensor (e.g., a temperature sensor, a smoke sensor, an air quality measurement sensor, etc.) provided on the camera 140 or the range hood 100 may detect the temperature of the subject for cooking 1 located on the upper plate of the cooking device 200, or detect smoke, dust, etc. generated from the cooking container 2 located on the upper plate of the cooking device 200.

The at least one processor 120 according to one or more embodiments of the disclosure may acquire each of the first identification information for the subject for cooking 1 and the second identification information for the cooking container 2 located on the upper plate of the cooking device 200 from the photographed image.

For example, the at least one processor 120 may input the photographed image into a first neural network model trained to identify the subject for cooking 1 and the cooking container 2 included in an image, and acquire the first identification information for the subject for cooking 1 and the second identification information for the cooking container 2.

Then, the at least one processor 120 may input the first identification information and the second identification information into a second neural network model trained to output the predicted concentration information and the expected cooking time, and acquire the predicted concentration information for the smoke, dust, cooking vapor, or cooking odor that are expected to be generated when cooking the subject for cooking 1 with the cooking container 2, and the expected cooking time when cooking the subject for cooking 1 with the cooking container 2.

Then, the at least one processor 120 may input the predicted concentration information and the expected cooking time into a third neural network model trained to output the operation information of the driving part, and acquire operation information including at least one of the operation strength of the driving part 110 during the expected cooking time (referred to as the first operation strength hereinafter), the additional operation time of the driving part 110 after the expected cooking time passed, or the operation strength of the driving part 110 during the additional operation time (referred to as the second operation strength hereinafter).

The foregoing is merely an example, and the disclosure is not limited thereto. For example, the at least one processor 120 may input the first identification information and the second identification information into the second neural network model, and acquire the predicted concentration information for the smoke, dust, cooking vapor, cooking odor, etc. that are expected to be generated when cooking the subject for cooking 1 with the cooking container 2. Then, the at least one processor 120 may input the predicted concentration information into the third neural network model trained to output the operation information of the driving part, and acquire operation information including the operation strength of the driving part 110 during the cooking time, the additional operation time of the driving part 110 after the cooking time passed, and the operation strength of the driving part 110 during the additional operation time.

According to one or more embodiments, when start of cooking for the subject for cooking 1 is identified through the camera 140 provided on the range hood 100, etc., the at least one processor 120 may operate the driving part 110 according to the first operation strength based on the operation information, and when completion of the cooking for the subject for cooking 1 is identified (i.e., after the cooking time for the subject for cooking 1 passed), the at least one processor 120 may operate the driving part 110 by the second operation strength during the additional operation time.

That is, the at least one processor 120 can operate the driving part 110 according to the first operation strength during the actual cooking time for the subject for cooking 1 (e.g., the time of heating the subject for cooking 1 by using the cooking device 200), but not the expected cooking time, and operate the driving part 110 according to the second operation strength after the actual cooking time passed. Here, the at least one processor 120 may receive information on whether the cooking device 200 is turned on through communication with the cooking device 200, or identify the actual cooking time through a photographed image of the camera 140 provided on the range hood 100, etc.

Also, the range hood 100 may acquire the operation information of the driving part 110 corresponding to the photographed image by using a plurality of neural network models.

For example, the at least one processor 120 may input the photographed image into a neural network model trained to identify the subject for cooking 1 and the cooking container 2 included in an image, and acquire the first identification information for the subject for cooking 1 and the second identification information for the cooking container 2.

Then, the at least one processor 120 may input the first identification information for the subject for cooking 1 and the second identification information for the cooking container 2 into a neural network model trained to identify a cooking method based on the subject for cooking 1 and the cooking container 2, and acquire a cooking method for the subject for cooking 1 (e.g., boiling, steaming, frying, grilling, etc. of the subject for cooking 1).

Then, the at least one processor 120 may input the subject for cooking 1 and the cooking method into a neural network model trained to identify the expected cooking time when cooking the subject for cooking 1 according to the cooking method, and acquire the expected cooking time.

Then, the at least one processor 120 may input the expected cooking time and the cooking method into a neural network model trained to identify the predicted concentration information for the smoke, dust, cooking vapor, cooking odor, etc. that are expected to be generated when cooking the subject for cooking by the cooking method during the expected cooking time, and acquire the predicted concentration information.

The at least one processor 120 may input the predicted concentration information into a neural network model trained to output the operation information of the driving part 110 corresponding to the predicted concentration information, and acquire the operation information including at least one of the first operation strength of the driving part 110 during the expected cooking time of the subject for cooking 1, the additional operation time of the driving part 110 after the expected cooking time passed, or the second operation strength of the driving part 110 during the additional operation time.

Meanwhile, the at least one processor 120 can acquire the operation information by using one neural network model but not a plurality of neural network models different from one another. For example, the at least one processor 120 can input a photographed image into a neural network model, and acquire the operation information of the driving part 110 from the neural network model.

Functions related to artificial intelligence according to the disclosure are operated through the at least one processor 120 and the memory of the range hood 100.

The at least one processor 120 may consist of one or a plurality of processors. Here, the one or plurality of processors may include at least one of a central processing unit (CPU), a graphic processing unit (GPU), or a neural processing unit (NPU), but the processors are not limited to the aforementioned examples of the processors.

A CPU is a generic-purpose processor that can perform not only general operations but also artificial intelligence operations, and it can effectively execute a complex program through a multilayer cache structure. A CPU is advantageous for a serial processing method that enables systemic linking of the previous calculation result and the next calculation result through sequential calculations. However, a generic-purpose processor is not limited to the aforementioned examples excluding cases wherein it is specified as the aforementioned CPU.

A GPU is a processor for mass operations such as a floating point operation used for graphic processing, etc., and it can perform mass operations in parallel by massively integrating cores. In particular, a GPU may be advantageous for a parallel processing method such as a convolution operation, etc. compared to a CPU. Also, a GPU may be used as a co-processor for supplementing the function of a CPU. However, a processor for mass operations is not limited to the aforementioned examples excluding cases wherein it is specified as the aforementioned GPU.

An NPU is a processor specialized for an artificial intelligence operation using an artificial neural network, and it can implement each layer constituting an artificial neural network as hardware (e.g., silicon). Here, the NPU is designed to be specialized according to the required specification of a user, and thus it has a lower degree of freedom compared to a CPU or a GPU, but it can effectively process an artificial intelligence operation required by the user. Meanwhile, as a processor specialized for an artificial intelligence operation, an NPU may be implemented in various forms such as a tensor processing unit (TPU), an intelligence processing unit (IPU), a vision processing unit (VPU), etc. However, an artificial intelligence processor is not limited to the aforementioned examples excluding cases wherein it is specified as the aforementioned NPU.

Also, the one or plurality of processors may be implemented as a system on chip (SoC). Here, the SoC may further include a memory, and a network interface such as a bus, etc. for data communication between the processor and the memory other than the one or plurality of processors.

In a case where a plurality of processors are included in the system on chip (SoC) included in the range hood 100, the range hood 100 may perform an operation related to artificial intelligence (e.g., an operation related to learning or inference of an artificial intelligence model) by using some processors among the plurality of processors. For example, the range hood 100 may perform an operation related to artificial intelligence by using at least one of a GPU, an NPU, a VPU, a TPU, or a hardware accelerator specialized for artificial intelligence operations such as a convolution operation, a matrix product operation, etc. among the plurality of processors. However, this is merely an example, and the range hood 100 can process an operation related to artificial intelligence by using a generic-purpose processor such as a CPU, etc.

Also, the range hood 100 may perform an operation related to artificial intelligence by using a multicore (e.g., a dual core, a quad core, etc.) included in one processor. In particular, the range hood 100 may perform artificial intelligence operations such as a convolution operation, a matrix product operation, etc. in parallel by using multicores included in the at least one processor 120.

The one or plurality of processors performs control to process input data according to pre-defined operation rules or an artificial intelligence model stored in the memory. The pre-defined operation rules or the artificial intelligence model are characterized in that they are made through learning.

Here, being made through learning means that predefined operation rules or an artificial intelligence model having desired characteristics are made by applying a learning algorithm to a plurality of learning data. Such learning may be performed in a device itself wherein artificial intelligence is performed according to the disclosure, or performed through a separate server/system.

An artificial intelligence model may consist of a plurality of neural network layers. At least one layer has at least one weight value, and performs an operation of the layer through the operation result of the previous layer and at least one defined operation. As examples of a neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN), deep Q-networks, and a Transformer, and the neural network in the disclosure is not limited to the aforementioned examples excluding cases clearly specified.

A learning algorithm is a method of training a specific subject device (e.g., a robot) by using a plurality of learning data and thereby making the specific subject device make a decision or make prediction by itself. As examples of learning algorithms, there are supervised learning, unsupervised learning, semi-supervised learning, or reinforcement learning, but learning algorithms in the disclosure are not limited to the aforementioned examples excluding cases clearly specified.

In the aforementioned examples, various embodiments of acquiring the operation information of the driving part 110 by using neural network models were explained, but the disclosure is not limited thereto. For example, the at least one processor 120 may acquire the operation information corresponding to the first identification information and the second identification information among the plurality of operation information stored in the memory. Detailed explanation in this regard will be described with reference to FIG. 6.

The range hood 100 according to one or more embodiments may include a memory, and the memory may store data necessary for the various embodiments of the disclosure. The memory may be implemented in a form of a memory embedded in the range hood 100, or implemented in a form of a memory that can be attached to or detached from the range hood 100 according to the use of the stored data.

For example, data for operation of the range hood 100 may be stored in the memory embedded in the range hood 100, and data for an extended function of the range hood 100 may be stored in the memory that can be attached to or detached from the range hood 100. In the case of the memory embedded in the range hood 100, the memory may be implemented as at least one of a volatile memory (e.g.: a dynamic ram (DRAM), a static RAM (SRAM), or a synchronous dynamic RAM (SDRAM), etc.) or a non-volatile memory (e.g.: an one time programmable ROM (OT-PROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). Also, in the case of the memory that can be attached to or detached from the range hood 100, the memory may be implemented in forms such as a memory card (e.g., compact flash (CF), secure digital (SD), micro secure digital (Micro-SD), mini secure digital (Mini-SD), extreme digital (xD), a multimedia card (MMC), etc.), an external memory that can be connected to a USB port (e.g., a USB memory), etc.

According to one or more embodiments, the memory may store at least one instruction for controlling the range hood 100, or a computer program including instructions.

In particular, the memory stores a plurality of driving information. Here, each of the plurality of driving information may include the expected cooking time according to the subject for cooking 1 and the cooking container 2, the exhaust strength (the first operation strength of the driving part 110 during the expected cooking time), the additional operation time, and the strength after completion (the second operation strength of the driving part 110 during the additional operation time).

For example, referring to FIG. 6, if the subject for cooking 1 identified from a photographed image is raw meat, and the cooking container 2 is a frying pan, the operation information corresponding to the raw meat and the frying pan may include the expected cooking time 15 minutes, the exhaust strength (the first operation strength of the driving part 110 during the expected cooking time) Max, the additional operation time 10 minutes, and the strength after completion (the second operation strength of the driving part 110 during the additional operation time) Max.

The at least one processor 120 according to one or more embodiments may operate the driving part 110 by the strength of Max (or, Boost) during 15 minutes, and operate the driving part 110 by the strength of Max during 10 minutes after 15 minutes passed based on the operation information corresponding to the raw meat and the frying pan.

As another example, if the subject for cooking 1 identified from a photographed image is an egg, and the cooking container 2 is a pot, the at least one processor 120 may operate the driving part 110 by the minimum strength (e.g., Low among Low, Med, High, and Boost) during 15 minutes, and finish the operation of the driving part 110 after 15 minutes passed based on the operation information corresponding to the egg and the pot.

According to one or more embodiments, each of the plurality of operation information stored in the memory may be acquired based on the use history for the range hood 100, or acquired based on the use history for another range hood 100' received through an external server, etc.

Also, each of the plurality of operation information stored in the memory can be received from an external server and stored in the memory. For example, if the operation information including the appropriate cooking time (or, the expected cooking time) in the standard recipe according to the subject for cooking 1 and the cooking container 2, the appropriate exhaust strength (the recommended exhaust strength) during the expected cooking time, the additional operation time, and the appropriate exhaust strength (the recommended exhaust strength) during the additional operation time is received from the external server, the at least one processor 120 may store the received operation information in the memory.

Figure 7:
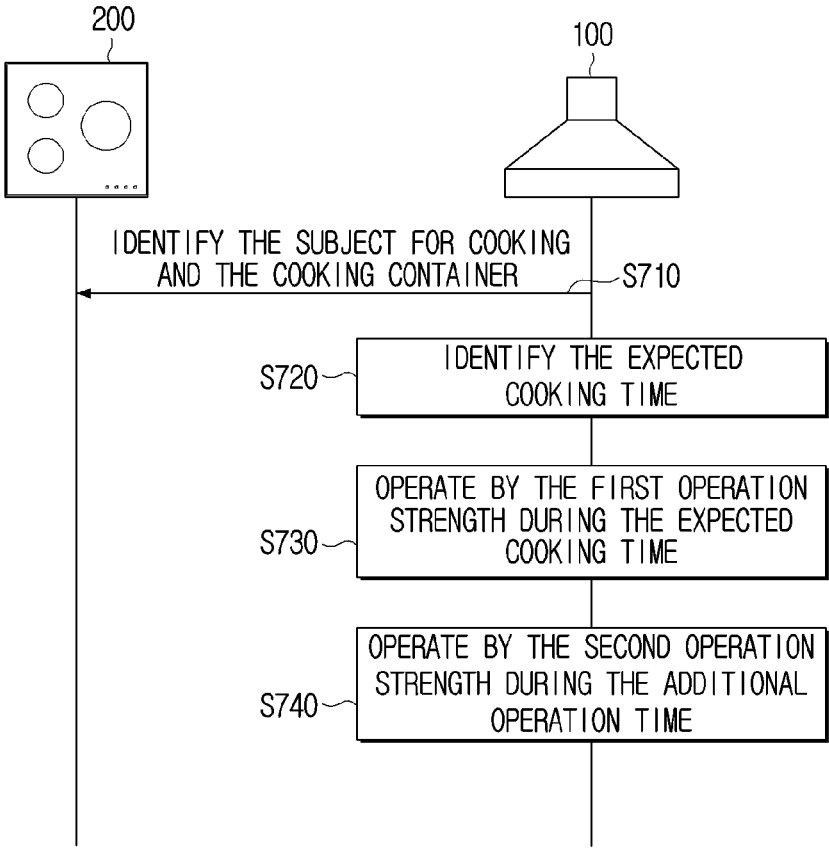
FIG. 7 is a sequence diagram for illustrating an operation of a range hood according to one or more embodiments of the disclosure.

FIG. 7 is a sequence diagram for illustrating an operation of a range hood according to one or more embodiments of the disclosure.

First, the at least one processor 120 may acquire the first identification information for the subject for cooking 1 and the second identification information for the cooking container 2 based on a photographed image received from the camera 140 in operation S710.

Then, the at least one processor 120 may identify the expected cooking time when cooking the subject for cooking 1 with the cooking container 2 based on the first identification information and the second identification information in operation S720.

As an example, the at least one processor 120 may input the photographed image, or the first and second identification information into the neural network model, and identify at least one of the expected cooking time, the first operation strength, the additional operation time, or the second operation strength.

For example, in the operation S720, the at least one processor 120 may input the photographed image into the neural network model, and acquire i) a cooking method for the subject for cooking 1, ii) the expected cooking time when cooking the subject for cooking 1 according to the cooking method, and iii) the predicted concentration information for the smoke, dust, cooking vapor, cooking odor, etc. that are expected to be generated when cooking the subject for cooking 1 by the cooking method during the expected cooking time.

For example, if the subject for cooking 1 included in the photographed image is raw meat, and the cooking container 2 is a frying pan, the at least one processor 120 may acquire i) a cooking method: grilling, ii) the expected cooking time: 15 minutes, and iii) the predicted concentration information: the concentration is very high (e.g., the concentration of smoke and odor is high, PM 2.5, approximately 878 $\mu g/m^2$).

Also, the at least one processor 120 may input the predicted concentration information into the neural network model, and acquire the operation information including at least one of the first operation strength of the driving part 110 during the expected cooking time of the subject for cooking 1, the additional operation time of the driving part 110 after the expected cooking time passed, or the second operation strength of the driving part 110 during the additional operation time.

As an example, the at least one processor 120 may identify the driving information corresponding to the first and second identification information among the plurality of driving information stored in the memory, and identify at least one of the expected cooking time, the first operation strength, the additional operation time, or the second operation strength included in the identified driving information.

Then, the at least one processor 120 may operate the driving part 110 by the first operation strength during the expected cooking time in operation S730.

Then, the at least one processor 120 may operate the driving part 110 by the second operation strength during the additional operation time after the expected cooking time passed in operation S740.

For example, if the subject for cooking 1 included in the photographed image is raw meat, and the cooking container 2 is a frying pan, the at least one processor 120 may operate the driving part 110 by the strength of Max during 25 minutes in total (the expected cooking time 10 minutes+the additional operation time 15 minutes).

The disclosure is not limited to the aforementioned example, and the at least one processor 120 can operate the driving part 110 according to the first operation strength during the actual cooking time for the subject for cooking 1 identified based on the photographed image (e.g., during the time between the starting time of heating the subject for cooking 1 by using the cooking device 200 and the completion time of heating), but not the expected cooking time, and operate the driving part 110 according to the second operation strength after the actual cooking time passed.

The range hood 100 according to one or more embodiments of the disclosure may perform communication with at least one of the cooking device 200 or a user terminal device. Detailed explanation in this regard will be described below.

Figure 8:
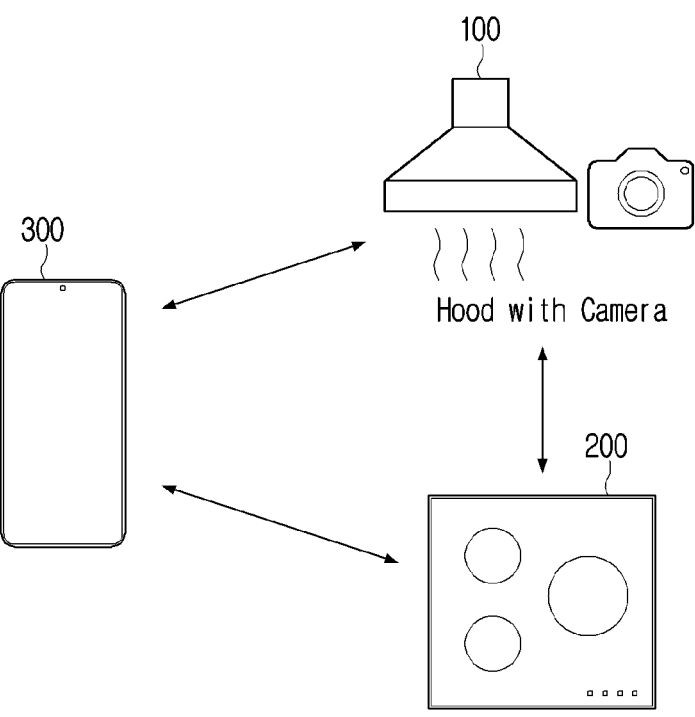
FIG. 8 is a diagram for illustrating communication among a range hood, a cooking device, and a user terminal device according to one or more embodiments of the disclosure.

FIG. 8 is a diagram for illustrating communication among a range hood, a cooking device, and a user terminal device according to one or more embodiments of the disclosure.

The range hood 100 according to one or more embodiments of the disclosure may further include a communication interface.

The communication interface according to one or more embodiments of the disclosure performs communication with an external device, and receives input of various types of data and information. For example, the communication interface may receive input of various types of data and information from a home appliance (e.g., a display device, an air conditioner, an air purifier, etc.), an external storage medium (e.g., a USB memory), an external server (e.g., a webhard), etc. through communication methods such as Wi-Fi based on AP (Wi-Fi, a Wireless LAN network), Bluetooth, Zigbee, a wired/wireless Local Area Network (LAN), a Wide Area Network (WAN), Ethernet, IEEE 1394, a High-Definition Multimedia Interface (HDMI), a Universal Serial Bus (USB), a Mobile High-Definition Link (MHL), Audio Engineering Society/European Broadcasting Union (AES/EBU), Optical, Coaxial, etc.

In particular, the communication interface according to one or more embodiments of the disclosure may perform communication with at least one external device (e.g., the cooking device 200, the refrigerator, etc.) included in a home, and receive information for a function performed in the external device, state information (or, context information) of the external device, etc.

According to one or more embodiments, the range hood 100 may perform communication with the cooking device 200.

For example, the cooking device 200 may transmit the state information of the cooking device 200 to the range hood 100.

Here, the state information of the cooking device 200 may include at least one of whether the cooking container 2 is detected on the upper plate of the cooking device 200, whether the burner area corresponding to the cooking container 2 is turned on among the plurality of burner areas included in the upper plate of the cooking device 200, or heating power strength information of the burner area corresponding to the cooking container 2 (e.g., if the cooking device 200 is an induction range, the strength of a current supplied to the induction coil included in the burner area corresponding to the cooking container 2).

As an example, the at least one processor 120 may acquire the operation information of the driving part 110 based on the state information, the first identification information, and the second identification information received from the cooking device 200.

Figure 9:
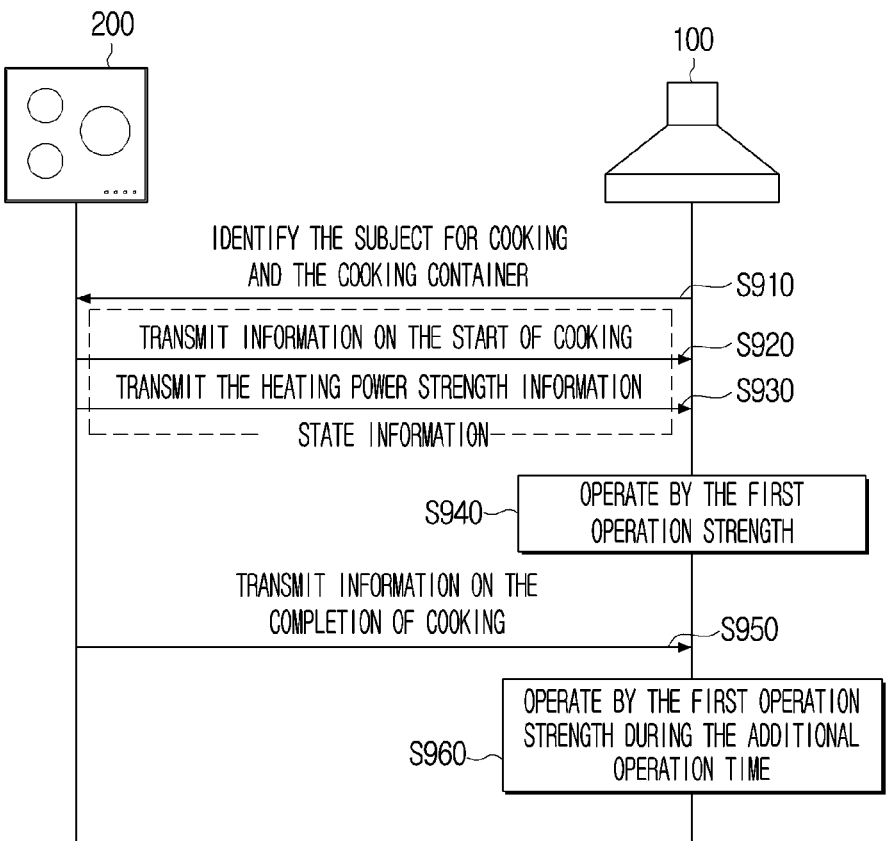
FIG. 9 is a sequence diagram for illustrating operations between a range hood and a cooking device according to one or more embodiments of the disclosure.

FIG. 9 is a sequence diagram for illustrating operations between a range hood and a cooking device according to one or more embodiments of the disclosure.

Referring to FIG. 9, the at least one processor 120 may acquire the first identification information for the subject for cooking 1 and the second identification information for the cooking container 2 based on a photographed image received from the camera 140 in operation S910.

Then, the at least one processor 120 may receive information on start of cooking from the cooking device 200 in operation S920. Here, the information on the start of cooking may include at least one of whether the cooking container 2 is detected on the upper plate of the cooking device 200, or whether the burner area corresponding to the cooking container 2 is turned on among the plurality of burner areas included in the upper plate of the cooking device 200 included in the state information of the cooking device 200.

As an example, if the cooking container 2 is detected on the upper plate of the cooking device 200, or the burner area corresponding to the cooking container 2 is turned on among the plurality of burner areas included in the upper plate of the cooking device 200 based on the information on the start of cooking received from the cooking device 200, the at least one processor 120 may identify that cooking for the subject for cooking 1 started.

Then, the at least one processor 120 may receive information on the heating power of the burner area corresponding to the cooking container 2 from the cooking device 200 in operation S930.

Then, the at least one processor 120 may input the heating power strength information, the first identification information, and the second identification information into a neural network model, and identify the expected cooking time, the first operation strength, the additional operation time, and the second operation strength.

For example, the at least one processor 120 may input the heating power strength information received in the operation S930 in addition to the first identification information and the second identification information into a neural network model, and acquire i) a cooking method for the subject for cooking 1, ii) the expected cooking time when cooking the subject for cooking 1 according to the cooking method, and iii) the predicted concentration information for the smoke, dust, cooking vapor, cooking odor, etc. that are expected to be generated when cooking the subject for cooking 1 by the cooking method during the expected cooking time.

For example, if the subject for cooking 1 included in a photographed image is raw meat, the cooking container 2 is a pot, and the heating power is "weak" (e.g., lower than 5,000 BTU) according to the heating power strength information, the at least one processor 120 may acquire i) a cooking method: boiling, ii) the expected cooking time: 100 minutes, and iii) the predicted concentration information: the concentration is medium (e.g., the concentration of smoke and odor is medium, PM 2.5, approximately 119 $\mu g/m^2$).

As another example, if the subject for cooking 1 included in a photographed image is raw meat, the cooking container 2 is a pot, and the heating power is "high" (e.g., approximately 15,000 BTU) according to the heating power strength information, the at least one processor 120 may acquire i) a cooking method: boiling, ii) the expected cooking time: 50 minutes, and iii) the predicted concentration information: the concentration is high (e.g., the concentration of smoke and odor is high, PM 2.5, approximately 500 $\mu g/m^2$).

Also, the at least one processor 120 may input the predicted concentration information into the neural network model, and acquire driving information including the first operation strength of the driving part 110 during the expected cooking time of the subject for cooking 1, the additional operation time of the driving part 110 after the expected cooking time passed, or the second operation strength of the driving part 110 during the additional operation time.

As an example, the at least one processor 120 may identify the driving information corresponding to the heating power strength information, the first identification information, and the second identification information among the plurality of driving information stored in the memory, and identify the expected cooking time, the first operation strength, the additional operation time, and the second operation strength included in the identified driving information.

Then, the at least one processor 120 may operate the driving part 110 by the first operation strength during the expected cooking time in operation S940.

Then, the at least one processor 120 may operate the driving part 110 by the second operation strength during the additional operation time after the expected cooking time passed in operation S960.

For example, if the subject for cooking 1 included in a photographed image is raw meat, the cooking container 2 is a pot, and the heating power is "weak" according to the heating power strength information, the at least one processor 120 may operate the driving part 110 by the medium strength (e.g., Med) during 100 minutes (the expected cooking time), and operate the driving part 110 by the minimum strength (e.g., Low) during 15 minutes (the additional operation time).

Meanwhile, the at least one processor 120 may identify a starting point of cooking for the subject for cooking 1 based on the information on the start of cooking received in the operation S920. Then, the at least one processor 120 may operate the driving part 110 by the first operation strength during the expected cooking time based on the starting point of cooking.

Also, the at least one processor 120 may identify an ending point of cooking for the subject for cooking 1 based on the information on the completion of cooking received in the operation S950.

Then, if the ending point of cooking arrives faster than the expected cooking time (e.g., the time between the starting point of cooking and the ending point of cooking is 15 minutes, and the expected cooking time is 20 minutes), the at least one processor 120 may operate the driving part 110 by the second operation strength during the additional operation time after the ending point of cooking arrived.

As an example, if the ending point of cooking arrives later than the expected cooking time (e.g., the time between the starting point of cooking and the ending point of cooking is 20 minutes, and the expected cooking time is 15 minutes), the at least one processor 120 may operate the driving part 110 by the first operation strength before the ending point of cooking arrives, and operate the driving part 110 by the second operation strength during the additional operation time after the ending point of cooking arrived.

The disclosure is not limited to the aforementioned example, and the at least one processor 120 can operate the driving part 110 according to the first operation strength during the actual cooking time for the subject for cooking 1 (e.g., during the time between the starting time of heating the subject for cooking 1 by using the cooking device 200 and the completion time of heating), but not the expected cooking time, and operate the driving part 110 according to the second operation strength after the actual cooking time passed based on the information on the start of cooking received in the operation S920 and the information on the completion of cooking received in the operation S950.

Returning to FIG. 8, the at least one processor 120 according to one or more embodiments may perform communication with the cooking device 200 and the user terminal device 300.

For example, the user terminal device 300 may transmit at least one of the first identification information for the subject for cooking 1 or the second identification information for the cooking container 2 to the range hood 100.

Also, the user terminal device 300 may set the operation information of the driving part 110 according to a user instruction, and transmit the set operation information to the range hood 100. For example, the user terminal device 300 may acquire operation information by setting at least one of the expected cooking time, the first operation strength of the driving part 110 during the expected cooking time, the additional operation time, or the second operation strength of the driving part 110 during the additional operation time according to a user instruction.

Then, the at least one processor 120 may operate the driving part 110 based on the operation information set according to the user instruction.

Figure 10:
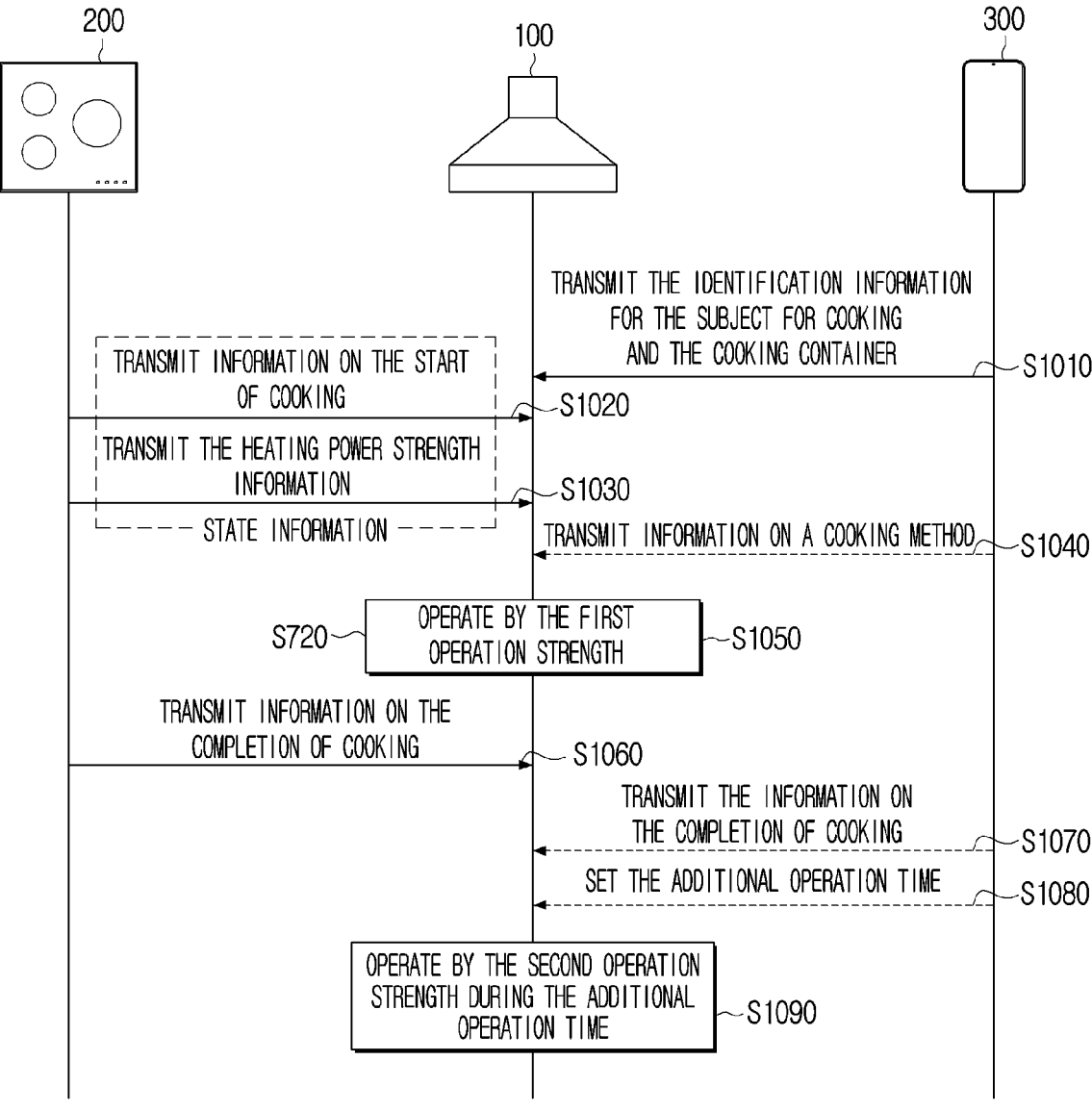
FIG. 10 is a sequence diagram for illustrating operations among a range hood, a cooking device, and a user terminal device according to one or more embodiments of the disclosure.

FIG. 10 is a diagram for illustrating operations among a range hood, a cooking device, and a user terminal device according to one or more embodiments of the disclosure.

First, the range hood 100 may receive at least one of the first identification information for the subject for cooking 1 or the second identification information for the cooking container 2 from the user terminal device 300 in operation S1010.

For example, the at least one processor 120 may acquire the first identification information and the second identification information from a photographed image, or receive the first identification information and the second identification information corresponding to each of the subject for cooking 1 and the cooking container 2 selected by the user through the user terminal device 300 from the user terminal device 300.

Then, as detailed explanation regarding operations S1020 and S1030 will respectively overlap with the detailed explanation regarding the operations S920 and S930 in FIG. 9, the detailed explanation will be omitted.

The at least one processor 120 may receive cooking method information from the user terminal device 300 in operation S1040. Here, the cooking method information may include a cooking method for the subject for cooking 1 (e.g., boiling, steaming, frying, grilling, etc. of the subject for cooking 1).

Then, the at least one processor 120 may input the heating power strength information received in the operation S1030, and the cooking method information received in the operation S1040 in addition to the first identification information and the second identification information into a neural network model, and acquire ii) the expected cooking time when cooking the subject for cooking 1 according to the cooking method, and iii) the predicted concentration information for the smoke, dust, cooking vapor, cooking odor, etc. that are expected to be generated when cooking the subject for cooking 1 by the cooking method during the expected cooking time.

For example, if the subject for cooking 1 included in a photographed image is raw meat, the cooking container 2 is a fryer, the heating power is "weak" (e.g., lower than 5,000 BTU) according to the heating power strength information, and the cooking method is frying, the at least one processor 120 may acquire ii) the expected cooking time: 20 minutes, and iii) the predicted concentration information: the concentration is very high (e.g., the concentration of smoke and odor is very high, PM 2.5, approximately 680 μg/m²).

Then, the at least one processor 120 may input the predicted concentration information into the neural network model, and acquire the operation information including at least one of the first operation strength of the driving part 110 during the expected cooking time of the subject for cooking 1, the additional operation time of the driving part 110 after the expected cooking time passed, or the second operation strength of the driving part 110.

Then, as detailed explanation regarding operation S1060 will overlap with the detailed explanation regarding the operation S950 in FIG. 9, the detailed explanation will be omitted.

Referring to FIG. 10, the user terminal device 300 may transmit the information on the completion of cooking to the range hood 100 in operation S1070. Also, the user terminal device 300 may set the additional operation time, and transmit it to the range hood 100 in operation S1080.

For example, in the operation S1070, the user terminal device 300 may communicate with the cooking device 200 and turn off the burner area corresponding to the cooking container 2 at the cooking device 200, and when the burner area is turned off, the user terminal device 300 may transmit the information on completion of cooking to the range hood 100.

For example, in the operation S1080, if at least one of the additional operation time or the second operation strength of the driving part 110 during the additional operation time is set according to a user instruction, the user terminal device 300 may transmit at least one of the set additional operation time or the set second operation strength to the range hood 100.

Then, in operation S1090, the at least one processor 120 may operate the driving part 110 based on at least one of the additional operation time or the second operation strength set according to the user instruction through the user terminal device 300 rather than on the photographed image or the driving information acquired based on the first and second identification information.

The user terminal device 300 may perform communication with the cooking device 200 and control turning on or turning off the cooking device 200, control the heating power, and receive state information of the cooking device 200 from the cooking device 200.

Also, the range hood 100 may perform communication with the user terminal device 300 and transmit the state information of the range hood 100, and transmit a photographed image acquired by the range hood 100 to the user terminal device 300.

Returning to FIG. 2, the range hood 100 according to one or more embodiments of the disclosure may include various types of sensors such as a temperature sensor, a smoke sensor, an air quality measurement sensor, etc.

As an example, the temperature sensor may detect the temperature of the subject for cooking 1 located on the upper plate of the cooking device 200. Then, the at least one processor 120 may adjust the operation strength of the driving part 110 based on the temperature of the subject for cooking 1.

For example, the at least one processor 120 may operate the driving part 110 by the first operation strength during the expected cooking time, and if the temperature of the subject for cooking 1 received from the temperature sensor during the expected cooking time is higher than or equal to a threshold temperature corresponding to the cooking method (e.g., 180° C. corresponding to frying), it is expected that smoke, dust, cooking vapor, cooking odor, etc. will be generated in very high concentration, and thus the at least one processor 120 may adjust the first operation strength (e.g., adjust from High to Boost).

As an example, the smoke sensor may detect the concentration of smoke generated from the upper plate of the cooking device 200. Then, the at least one processor 120 may adjust the operation strength of the driving part 110 based on the smoke concentration.

For example, the at least one processor 120 may operate the driving part 110 by the first operation strength during the expected cooking time, and if the smoke concentration received from the smoke sensor during the expected cooking time exceeds the smoke concentration according to the predicted concentration information, smoke, dust, cooking vapor, cooking odor, etc. will be generated in very high concentration, and thus the at least one processor 120 may adjust the first operation strength (e.g., adjust from High to Boost).

As another example, the at least one processor 120 may operate the driving part 110 by the first operation strength during the expected cooking time, and if the smoke concentration received from the smoke sensor during the expected cooking time is lower than the smoke concentration according to the predicted concentration information, smoke, dust, cooking vapor, or cooking odor, etc. will be generated in rather low concentration, and thus the at least one processor 120 may adjust the first operation strength (e.g., adjust from High to Med).

As an example, the air quality measurement sensor may measure the air quality of the upper plate of the cooking device 200. Then, the at least one processor 120 may update the operation information of the driving part 110 based on the measured air quality.

For example, the air quality measurement sensor may measure the concentration of at least one of PM 10, PM 2.5, PM 1.0, carbon dioxide, smoke, cooking vapor, or cooking odor. Here, the numerical value PM 10 indicates the concentration of airborne dust in a size of 10 μm, the numerical value PM 2.5 indicates the concentration of airborne dust in a size of 2.5 μm, and the numerical value PM 1 indicates the concentration of airborne dust in a size of 1 μm.

For example, the at least one processor 120 may operate the driving part 110 by the first operation strength during the expected cooking time, and if the cooking odor concentration received from the air quality measurement sensor during the expected cooking time exceeds the cooking odor concentration according to the predicted concentration information, smoke, dust, cooking vapor, or cooking odor, etc. will be generated in very high concentration, and thus the at least one processor 120 may adjust the first operation strength (e.g., adjust from High to Boost).

For example, if the cooking vapor concentration received from the air quality measurement sensor during the additional operation time exceeds the cooking vapor concentration according to the predicted concentration information, smoke, dust, cooking vapor, cooking odor, etc. will remain in very high concentration, and thus the at least one processor 120 may extend the additional operation time or adjust the second operation strength (e.g., adjust from High to Boost).

As another example, if the cooking odor concentration received from the air quality measurement sensor during the additional operation time is lower than the cooking odor concentration according to the predicted concentration information, smoke, dust, cooking vapor, or cooking odor, etc.

will remain in rather low concentration, and thus the at least one processor 120 may shorten the additional operation time or adjust the second operation strength (e.g., adjust from High to Med).

Meanwhile, the at least one processor 120 may receive sensing data from a sensor by a predetermined time interval, and update the operation information based on the sensing data.

Here, the sensing data of the sensor may include the temperature of the subject for cooking 1 if the sensor is implemented as a temperature sensor, and if the sensor is implemented as a smoke sensor, the sensing data may include the concentration of smoke generated from the upper plate of the cooking device 200, and if the sensor is implemented as an air quality measurement sensor, the sensing data may include the air quality of the upper plate of the cooking device 200.

The various embodiments of the disclosure can be performed at an external server instead of the range hood 100. For example, the range hood 100 may acquire a photographed image by using the camera 140, and transmit the photographed image to an external server. Then, the range hood 100 may receive the operation information of the driving part 110 from the external server.

An external server according to one or more embodiments may acquire the first identification information and the second identification information when a photographed image is received, and acquire the operation information of the driving part 110 based on the first identification information and the second identification information. Then, the external server may transmit the operation information to the range hood 100.

Figure 11:
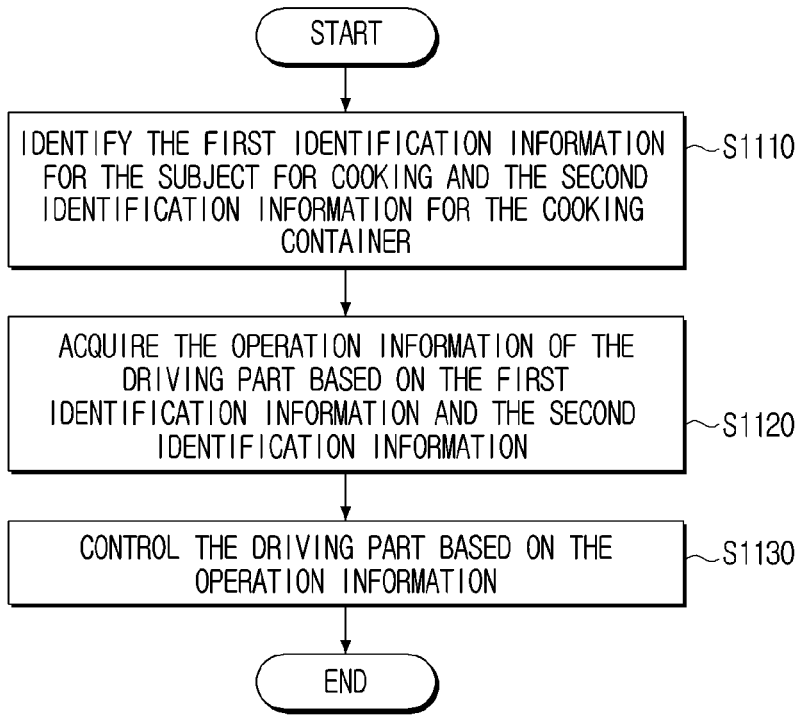
FIG. 11 is a flow chart for illustrating a control method of a range hood according to one or more embodiments of the disclosure.

FIG. 11 is a flow chart for illustrating a control method of a range hood according to one or more embodiments of the disclosure.

In a control method of a range hood including a driving part that suctions the ambient air and discharges the air to the outside, first identification information for a subject for cooking and second identification information for a cooking container are acquired in operation S1110.

Then, operation information of the driving part is acquired based on the first identification information and the second identification information in operation S1120.

Then, the driving part is controlled based on the operation information in operation S1130.

Here, the operation information may include a first operation strength of the driving part during the expected cooking time of the subject for cooking, an additional operation time of the driving part after the expected cooking time passed, and a second operation strength of the driving part during the additional operation time.

The operation S1120 of acquiring the operation information according to one or more embodiments may include inputting the first identification information and the second identification information into a trained neural network model and acquiring the operation information including an expected cooking time when cooking the subject for cooking with the cooking container, and the operation S1130 of controlling may include controlling the driving part by the first operation strength during the expected cooking time, and after the expected cooking time passed, controlling the driving part by the second operation strength during the additional operation time.

The range hood according to one or more embodiments may further include a camera photographing the upper plate of a cooking device located below the driving part, and the operation S1110 of acquiring the first identification information and the second identification information may include acquiring a photographed image for the upper plate of the cooking device by using the camera, and acquiring each of the first identification information for the subject for cooking located on the upper plate and the second identification information for the cooking container located on the upper plate based on the photographed image.

Here, the operation S1120 of acquiring the operation information may, based on receiving state information of the cooking device from the cooking device, inputting the state information, the first identification information, and the second information into a neural network model and acquiring the operation information, and the state information may include at least one of whether a burner area corresponding to the cooking container on the upper plate is turned on or heating power strength information of the burner area.

Here, the operation S1130 of controlling may include identifying a starting point of cooking for the subject for cooking based on whether the burner area is turned on included in the state information, and controlling the driving part by the first operation strength based on the starting point of cooking.

The operation S1130 of controlling according to one or more embodiments may include identifying an ending point of cooking for the subject for cooking based on whether the burner area is turned off included in the state information, and controlling the driving part by the second operation strength based on the ending point of cooking.

Also, the operation S1120 of acquiring the operation information according to one or more embodiments may include inputting the first identification information and the second identification information into a trained neural network model and acquiring the operation information including predicted concentration information while the subject for cooking is being cooked, and the predicted concentration information may be information including the predicted concentration of at least one of smoke, dust, cooking odor, or cooking vapor generated while the subject for cooking is being cooked.

Here, the neural network model may be a model trained to output the first operation strength, the additional operation time of the driving part after the expected cooking time passed, and the second operation strength based on the predicted concentration information.

The operation S1110 of acquiring the first identification information and the second identification information according to one or more embodiments may include acquiring at least one of the first identification information, the second identification information, or the state information of the cooking device wherein the cooking container is located from a user terminal device, and the operation S1120 of acquiring the operation information may include inputting the first identification information, the second identification information, and the state information of the cooking device into a neural network model and acquiring the operation information.

The range hood according to one or more embodiments may further include an air quality measurement sensor, and the control method may further include, based on receiving sensing data of the air quality measurement sensor, updating the operation information of the driving part based on the received sensing data.

The various embodiments of the disclosure can be applied not only to a range hood, but also to various types of electronic devices.

The various embodiments described above may be implemented in a recording medium that can be read by a computer or a device similar to a computer, by using software, hardware, or a combination thereof. In some cases, the embodiments described in this specification may be implemented as a processor itself. According to implementation by software, the embodiments such as procedures and functions described in this specification may be implemented as separate software modules. Each of the software modules can perform one or more functions and operations described in this specification.

Computer instructions for performing processing operations of an electronic device according to the aforementioned various embodiments of the disclosure may be stored in a non-transitory computer-readable medium. Computer instructions stored in such a non-transitory computer-readable medium may make the processing operations at the range hood 100 according to the aforementioned various embodiments performed by a specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM, and the like.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A range hood comprising:
a driving part configured to suction air from a first location and discharge the suctioned air to a second location;
at least one memory storing at least one instruction; and
at least one processor configured to execute the at least one instruction to:
acquire first identification information related to a subject for cooking and second identification information related to a cooking container,
acquire operation information of the driving part based on the first identification information and the second identification information, and
control the driving part based on the operation information,
wherein the operation information comprises:
at least one of a first operation strength of the driving part corresponding to a cooking time of the subject for cooking, an additional operation time of the driving part corresponding to a period following the cooking time, or a second operation strength of the driving part corresponding to the additional operation time.

2. The range hood of claim 1,
wherein the at least one processor is further configured to execute the at least one instruction to:
input the first identification information and the second identification information into a trained neural network model and acquire the operation information comprising an expected cooking time corresponding to the subject for cooking and the cooking container, control the driving part to operate at the first operation strength during the expected cooking time, and
control the driving part to operate at the second operation strength during the additional operation time.

3. The range hood of claim 1, further comprising:
a camera configured to capture an image of an upper plate of a cooking device located below the driving part,
wherein the at least one processor is further configured to execute the at least one instruction to:
based on acquiring an image through the camera comprising the subject for cooking located on the upper plate and the cooking container located on the upper plate, acquire each of the first identification information and the second identification information based on the acquired image.

4. The range hood of claim 3, further comprising:
a communication interface,
wherein the at least one processor is further configured to execute the at least one instruction to:
based on receiving state information of the cooking device from the cooking device through the communication interface, input the state information, the first identification information, and the second identification information into a trained neural network model and acquire the operation information, and
wherein the state information comprises:
at least one of burner activation information comprising an activation state of a burner area corresponding to a location of the cooking container on the upper plate or heating power strength information corresponding to the burner area corresponding to the location of the cooking container on the upper plate.

5. The range hood of claim 4,
wherein the at least one processor is further configured to execute the at least one instruction to:
identify a starting point of cooking for the subject for cooking based on the burner activation information, and
control the driving part to operate at the first operation strength based on the identified starting point of cooking.

6. The range hood of claim 4,
wherein the at least one processor is further configured to execute the at least one instruction to:
identify an ending point of cooking for the subject for cooking based on the burner activation information, and
control the driving part to operate at the second operation strength based on the identified ending point of cooking.

7. The range hood of claim 1,
wherein the at least one processor is further configured to execute the at least one instruction to:
input the first identification information and the second identification information into a trained neural network model and acquire the operation information comprising predicted concentration information corresponding to a time when the subject for cooking is being cooked, and
wherein the predicted concentration information comprises a predicted concentration of at least one of smoke, dust, cooking odor, or cooking vapor generated while the subject for cooking is being cooked.

8. The range hood of claim 7,
wherein the trained neural network model is configured to output the first operation time, the additional operation time and the second operation strength based on the predicted concentration information.

9. The range hood of claim 1, further comprising:
a communication interface,
wherein the at least one processor is further configured to execute the at least one instruction to:
acquire, through the communication interface, at least one of the first identification information, the second identification information, or information on a state of the cooking device wherein the cooking container is located, and
input the first identification information, the second identification information, or the state information into a trained neural network model and acquire the operation information.

10. The range hood of claim 1, further comprising:
an air quality sensor,
wherein the at least one processor is further configured to execute the at least one instruction to:
based on receiving sensing data through the air quality sensor, update the operation information of the driving part based on the received sensing data.

11. A method of controlling a range hood comprising a driving part configured to suction air from a first location and discharge the suctioned air to a second location, the method comprising:
acquiring first identification information related to a subject for cooking and second identification information related to a cooking container;
acquiring operation information of the driving part based on the first identification information and the second identification information; and
controlling the driving part based on the operation information,
wherein the operation information comprises:
at least one of a first operation strength of the driving part corresponding to a cooking time of the subject for cooking, an additional operation time of the driving part corresponding to a period following the cooking time, or a second operation strength of the driving part corresponding to the additional operation time.

12. The control method of claim 11,
wherein the acquiring the operation information comprises:
inputting the first identification information and the second identification information into a trained neural network model and acquiring the operation information comprising an expected cooking time corresponding to the subject for cooking and the cooking container, and
wherein the controlling the driving part further comprises:
controlling the driving part to operate at the first operation strength during the expected cooking time, and
controlling the driving part to operate at the second operation strength during the additional operation time.

13. The control method of claim 11,
wherein the range hood further comprises a camera configured to capture an image of an upper plate of a cooking device located below the driving part, and
wherein the acquiring the first identification information and the second identification information comprises:
acquiring an image through the camera of the upper plate of the cooking device, wherein the acquired image comprises images of the subject for cooking located on the upper plate and the cooking container located on the upper plate; and
acquiring each of the first identification information and the second identification information based on the acquired image.

14. The control method of claim 13,
wherein the acquiring the operation information further comprises:
based on receiving state information of the cooking device from the cooking device, inputting the state information, the first identification information, and the second identification information into a trained neural network model and acquiring the operation information, and
wherein the state information comprises:
at least one of burner activation information comprising an activation state of a burner area corresponding to a location of the cooking container on the upper plate or heating power strength information corresponding to the burner area corresponding to the location of the cooking container on the upper plate.

15. The control method of claim 14,
wherein the controlling the driving part further comprises:
identifying a starting point of cooking for the subject for cooking based on the burner activation information; and
controlling the driving part to operate at the first operation strength based on the identified starting point of cooking.

16. A non-transitory computer readable medium having instructions stored therein, which when executed by a processor cause the processor to execute a method of controlling a range hood comprising a driving part configured to suction air from a first location and discharge the suctioned air to a second location, the method comprising:
acquiring first identification information related to a subject for cooking and second identification information related to a cooking container;
acquiring operation information of the driving part based on the first identification information and the second identification information; and
controlling the driving part based on the operation information,
wherein the operation information comprises:
at least one of a first operation strength of the driving part corresponding to a cooking time of the subject for cooking, an additional operation time of the driving part corresponding to a period following the cooking time, or a second operation strength of the driving part corresponding to the additional operation time.

17. The non-transitory computer readable medium of claim 16,
wherein the acquiring the operation information comprises:
inputting the first identification information and the second identification information into a trained neural network model and acquiring the operation information comprising an expected cooking time corresponding to the subject for cooking and the cooking container, and
wherein the controlling the driving part further comprises:
controlling the driving part to operate at the first operation strength during the expected cooking time, and controlling the driving part to operate at the second operation strength during the additional operation time.

18. The non-transitory computer readable medium of claim 16, wherein the range hood further comprises a camera configured to capture an image of an upper plate of a cooking device located below the driving part, and wherein the acquiring the first identification information and the second identification information comprises:

acquiring an image through the camera of the upper plate of the cooking device, wherein the acquired image comprises images of the subject for cooking located on the upper plate and the cooking container located on the upper plate; and acquiring each of the first identification information and the second identification information based on the acquired image.

19. The non-transitory computer readable medium of claim 18, wherein the acquiring the operation information further comprises:

based on receiving state information of the cooking device from the cooking device, inputting the state information, the first identification information, and the second identification information into a trained neural network model and acquiring the operation information, and wherein the state information comprises:

at least one of burner activation information comprising an activation state of a burner area corresponding to a location of the cooking container on the upper plate or heating power strength information corresponding to the burner area corresponding to the location of the cooking container on the upper plate.

20. The non-transitory computer readable medium of claim 19, wherein the controlling the driving part further comprises:

identifying a starting point of cooking for the subject for cooking based on the burner activation information; and controlling the driving part to operate at the first operation strength based on the identified starting point of cooking.

\* \* \* \* \*